United States Patent [19]

Takakusaki

[11] Patent Number: 5,625,641
[45] Date of Patent: Apr. 29, 1997

[54] CORRELATOR, SYNCHRONIZER PROVIDED WITH THE CORRELATOR, AND FAST FREQUENCY HOPPING SPREAD SPECTRUM RECEIVER PROVIDED WITH THE SYNCHRONIZER

[75] Inventor: Keiji Takakusaki, Yokohama, Japan

[73] Assignee: Matsushita Electric Industrial Co., Ltd., Osaka, Japan

[21] Appl. No.: 579,426

[22] Filed: Dec. 27, 1995

[30] Foreign Application Priority Data

Jan. 9, 1995 [JP] Japan .................... 7-016391

[51] Int. Cl.$^6$ .............................. H04L 27/30; H04L 7/00
[52] U.S. Cl. ................... 375/202; 375/208; 375/354
[58] Field of Search ............................. 375/202, 208, 375/200, 343, 354, 367

[56] References Cited

U.S. PATENT DOCUMENTS 4,435,821  3/1984  Ito et al. .
5,432,814  7/1995  Hasegawa ..................... 375/202

Primary Examiner—Stephen Chin
Assistant Examiner—Hai H. Phan
Attorney, Agent, or Firm—Watson Cole Stevens Davis, P.L.L.C.

[57] ABSTRACT

A synchronizer of a fast frequency hopping spread spectrum receiver includes a correlator and a peak detection circuit for detecting the peak of the output signal of the correlator and outputting a detection signal. A sampler has the output signal of the correlator pass therethrough when the detection signal is outputted from the synchronizer. A code discriminating circuit discriminates the code of the output signal of the sampler. M pieces of frequency synthesizers of the correlator output M pieces of sinusoidal wave signals having the same frequencies as the frequencies of M pieces of carriers, respectively. A delay line of the correlator includes a plurality of delay elements connected with one another in a cascade, and delays the input signal of the correlator by each delay element and converts the input signal into M pieces of parallel input signals having different delay time, respectively. Besides, the delay time of respective delay elements is defined as a chip period. Each of M pieces of multipliers of the correlator multiplies one of M pieces of parallel signals by one of M pieces of sinusoidal wave signals which has been made to correspond in advance to the one parallel signal. A detection circuit of the correlator detects the output signals of M pieces of multipliers, respectively. An adder of the correlator adds up the output signals of M pieces of detection circuits.

6 Claims, 8 Drawing Sheets

CORRELATOR, SYNCHRONIZER PROVIDED WITH THE CORRELATOR, AND FAST FREQUENCY HOPPING SPREAD SPECTRUM RECEIVER PROVIDED WITH THE SYNCHRONIZER

BACKGROUND OF THE INVENTION

1. Field of the Invention

The present invention relates to a fast frequency hopping spread spectrum receiver used in digital mobile radio communication or the like, and a correlator and synchronizer that are assembled therein, and more particularly to those in which synchronization of a hopping sequence is made acquirable at a high speed.

2. Description of the Related Art

In a frequency hopping spread spectrum system used in a digital mobile radio communication system or the like, transmission is carried out by cutting and dividing narrow-band modulated signals in phase shift keying (PSK), frequency shift keying (FSK) or the like in pieces time-wise so as to disperse them in a plurality of frequency bands (frequency slots) as shown in FIG. 1. A piece of the signal cut and divided in pieces is called a "chip" and the length thereof is referred to as a chip period Tc (sec). A system of setting the chip period Tc to a bit period Tb or below is called Fast Frequency Hopping Spread Spectrum (abbreviated hereinafter as FFHSS) system. Besides, that in which the chip period Tc exceeds the bit period Tb is called slow frequency hopping.

When it is assumed in fast frequency hopping that a hopping sequence length is M, there is the relationship Tb=M·Tc. The arrangement of chip signals follows the hopping sequence given individually to respective users. When FIG. 1 is taken as an example, it is shown that the hopping sequence length M is 4, and the adopted hopping sequence is "1, 4, 2, 3". Four chip signals that constitute one bit are arranged in the frequency bands of $f_1$, $f_4$, $f_2$ and $f_3$, respectively. It is possible to standardize the communication quality by having a carrier frequency change finely as described above so that the signals are constituted so as not to stay long at a frequency in a bad communication state.

As shown in FIG. 2, a conventional FFHSS receiver is provided with a receiving antenna 1 for receiving an electric wave (an FFHSS signal), a local oscillator 3 for generating a signal for shifting a frequency band of a received signal to a band of an intermediate frequency, a first multiplier 2 for multiplying the received signal by the output signal of the local oscillator 3, a band-pass filter (BPF) 4 for limiting a band of the output signal of the first multiplier 2, a hopping synthesizer 22 for outputting signals of hopping sequence allocated to a user, a second multiplier 21 for multiplying the output signal of the band-pass filter 4 by the signal of the hopping sequence, a low-pass filter (LPF) 23 for limiting the band of the output signal of the second multiplier 21, a power measuring equipment 24 for measuring a detection power for one bit portion from the output signal of the low-pass filter 23, a hopping sequence phase control circuit 25 for aiming at synchronization of the hopping sequence by controlling the hopping synthesizer 22 on the basis of the result of measurement by the power measuring equipment 24, a differential detection circuit 26 for performing the differential detection of the output signal of the low-pass filter 23 by means of a one-bit delay element 27 and a third multiplier 28, and a code discriminator 9 for discriminating a detected code.

In this receiver, the FFHSS signal received by the receiving antenna 1 is multiplied by a sinusoidal wave signal of a frequency $f_{RF}-f_{IF}$ generated by the local oscillator 3 using the first multiplier 2 and the band is limited with the band-pass filter 4, thereby to convert the received signal into a signal in an intermediate frequency band having a central frequency at $f_{IF}$.

Next, the signal is multiplied by the output signal generated by the hopping synthesizer 22 using the second multiplier 21 and is applied with band limitation by means of the low-pass filter 23. The hopping synthesizer 22 outputs a signal in which the frequency changes along with the time in accordance with the hopping sequence allocated to respective users. As a result, the received signal that has been applied with frequency hopping is converted into the original narrow-band signal. This operation is referred to as despread.

The timing of the hopping sequence outputted from the hopping synthesizer 22 has to be synchronized with the timing of the hopping sequence of the received signal. This synchronization acquisition is performed as described hereunder.

A signal after despread is inputted to the power measuring equipment 24, squared and integrated for one bit interval, thereby to obtain a detection power for one bit portion. Then, the timing of the hopping sequence outputted from the hopping synthesizer 22 is delayed by one chip by means of the hopping detection phase control circuit 25, and the signal after despread is squared and integrated for one bit interval again, thereby to obtain the detection power for one bit portion. This operation is repeated so as to search the timing of the hopping sequence in which the largest detection power is obtainable.

When FIG. 1 is taken as an example, "1, 4, 2, 3" is outputted as the hopping sequence in the first one bit period Tb, "3, 1, 4, 2" is outputted in the next one bit period, "2, 3, 1, 4" is outputted in the next one bit period, and "4, 2, 3, 1" is outputted in the next one bit period, thus measuring the detection power in respective bit intervals. When the hopping sequence length is "4", any of the timings of these four hopping sequence coincides with the timing of the hopping sequence in the received signal, and the detection power in the bit interval when the hopping sequence of the coincident timing are outputted shows the peak value.

Thereafter, synchronization of the hopping sequence is maintained by outputting the hopping sequence in the coincident timing from the hopping synthesizer 22.

The despread signal is detected in the next place. Here, it is assumed that a PSK system is used for primary modulation, and a differential detection system is used for detection. Detection is made by means of the differential detection circuit 26 composed of the one-bit delay element 27 and the third multiplier 28, and then code decision is made by the code discriminator 9, thereby to discriminate the code. When an FSK system is used as the primary modulation system, a frequency discriminator is used in place of the differential detection circuit 26.

In the conventional fast frequency hopping spread spectrum receiver, however, the detection power sample is given only once per the bit period Tb (sec) to the hopping sequence phase control circuit 25 in synchronization acquisition of the hopping sequence. As a result, the time M·Tb (sec) becomes necessary for the hopping sequence phase control circuit 25 to obtain M (hopping sequence length) pieces of detection power samples, thus requiring the time of M·Tb or longer for the synchronization acquisition.

The time required for the synchronization acquisition of the hopping sequence is increased as the number of chips

3

(i.e., M) per one bit is increased. As a result, it becomes necessary to add training data for longer synchronization acquisition before communication is started, and the utilization efficiency of the communication circuit is lowered.

SUMMARY OF THE INVENTION

The present invention solves such conventional problems, and aims at providing a fast frequency hopping spread spectrum receiver capable of performing the synchronization acquisition of the hopping sequence in a short period of time, and a correlator and synchronizer used therein.

Thereupon, according to the present invention, there are provided in a correlator of a receiver of an FFHSS system in which a narrow-band modulated signal to be transmitted is cut and divided into M pieces of signal chips per one bit time-wise and respective signal chips are transmitted in individual frequency band ($f_1$ to $f_M$), M pieces of frequency synthesizers for outputting respective signals of frequencies ($f_1$ to $f_M$), delay means for delaying a received signal with a chip period as the unit and outputting M pieces of parallel data having different delay time, M pieces of multiplying means for multiplying respective signals outputted from the delay means by signals outputted from each of frequency synthesizers, M pieces of detection means for detecting signals outputted from each of the multiplying means, and adding means for adding respective detected outputs of the detection means.

Further, a synchronizer of an FFHSS receiver is composed of this correlator and a peak detection means for detecting a peak of an output signal outputted from the correlator and outputting a detected signal.

Further, an FFHSS receiver is composed of this synchronizer, a sampler for having an output signal of the correlator pass therethrough when the detected signal is outputted from the synchronizer, and a code discriminating means for discriminating a code of the signal outputted from the sampler.

Further, a frequency synthesizer and a multiplying means of this correlator are constituted of digital elements, and the delay means is composed of a shift register. Further, this digitalized correlator is also used in the synchronizer and the receiver.

Accordingly, in the correlator of the present invention, it is possible to complete the processing of obtaining correlation between an input signal and an output signal of a hopping synthesizer while spending the time of the bit period Tb (sec) so far during the time of the chip period Tc (sec) by taking partial charge of processing with M pieces of multipliers and M pieces of synthesizers.

Accordingly, when correlation is obtained continuously for the bit period Tb while delaying the input signal by the unit of the chip period Tc, a peak appears in the output of the correlator at a point of time when the hopping sequence is synchronized.

The synchronizer of the present invention acquires synchronization by detecting this peak that appears at a rate of once per one bit.

Further, the receiver of the present invention discriminates the code of the output of the correlator when the synchronizer detects a peak, thereby to identify the transmitted signal.

Further, when a component such as a correlator is composed of digital elements, characteristics are stabilized and formation into an LSI becomes possible, thus making it possible to make the hardware scale smaller.

4

DESCRIPTION OF THE PREFERRED EMBODIMENTS (The First Embodiment)

Figure 6:
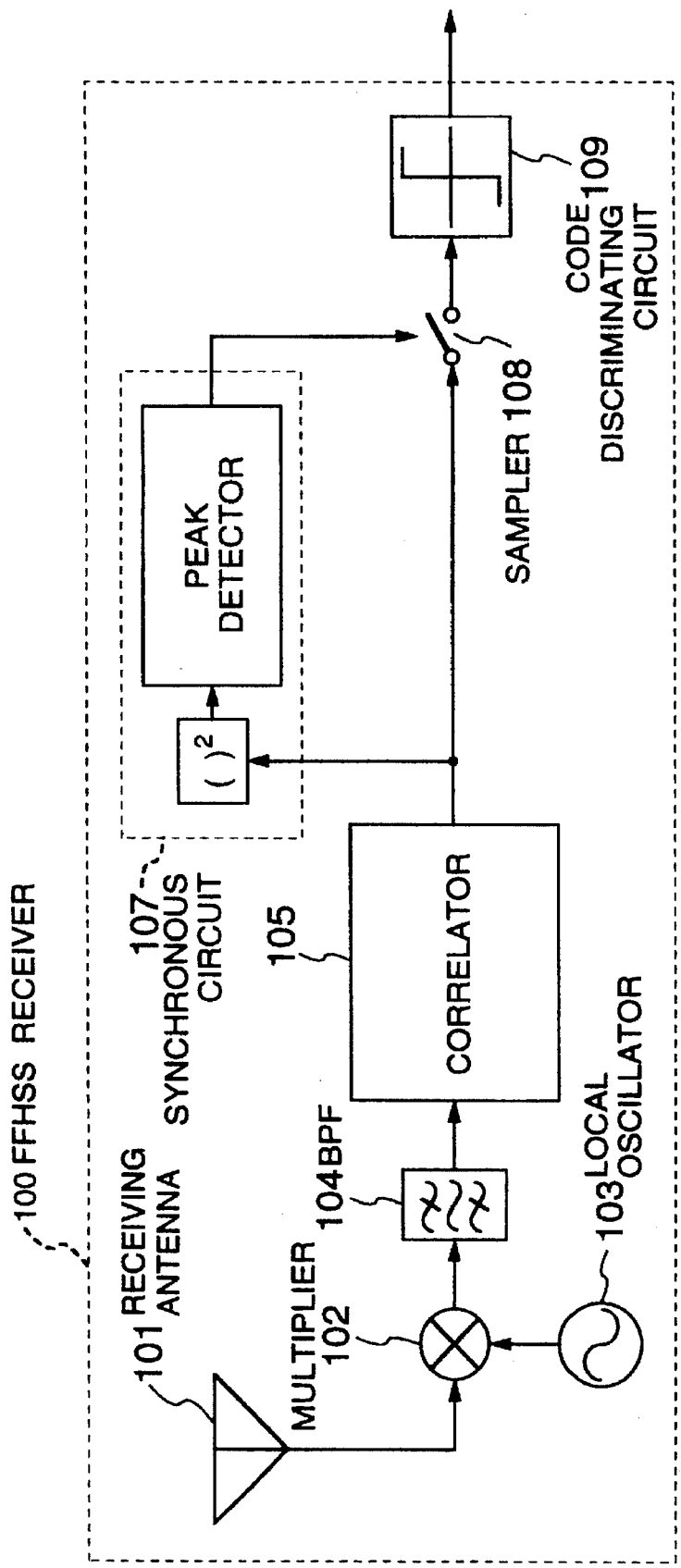
FIG. 6 is a block diagram of the FFHSS receiver according to the first embodiment.

An FFHSS receiver 100 according to a first embodiment of the present invention is, as shown in FIG. 6, provided with a receiving antenna 101 for receiving an electric wave, a local oscillator 103 for generating a signal for shifting a frequency band of a received signal to a band of an intermediate frequency, a multiplier 102 for multiplying the received signal by the output signal of the local oscillator 103, a bandpass filter (BPF) 104 for limiting the band of the output signal of the multiplier 102, a correlator 105 for obtaining correlation between the received FFHSS signal and an allocated hopping sequence, a sampler 108 for sampling the output signal of the correlator 105, a synchronous circuit 107 for giving a timing of sampling to the sampler 108 from the output signal of the correlator 105, and a code discriminating circuit 109 for deciding the code of the output of the sampler 108.

Figure 1:
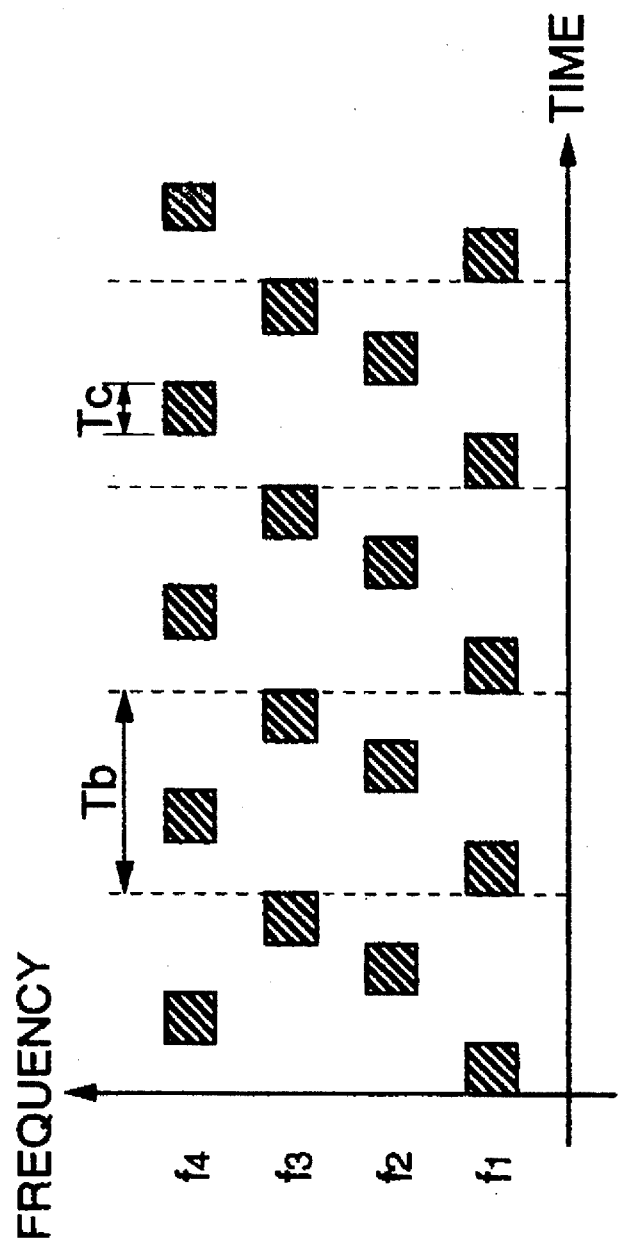
FIG. 1 is a typical diagram showing the relationship between an occupying band of an FFHSS signal and time.
Figure 2:
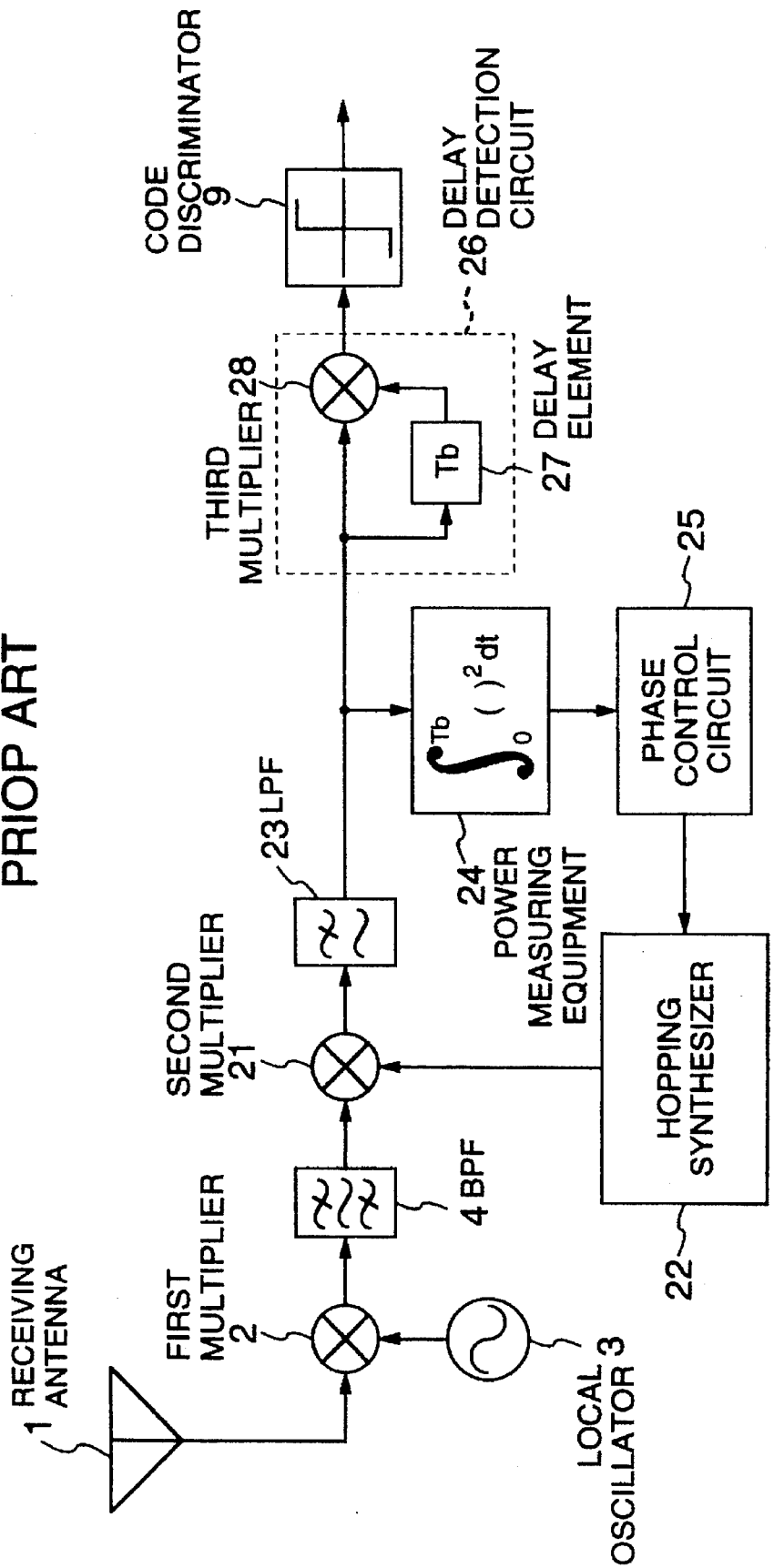
FIG. 2 is a block diagram of a conventional FFHSS receiver.
Figure 3:
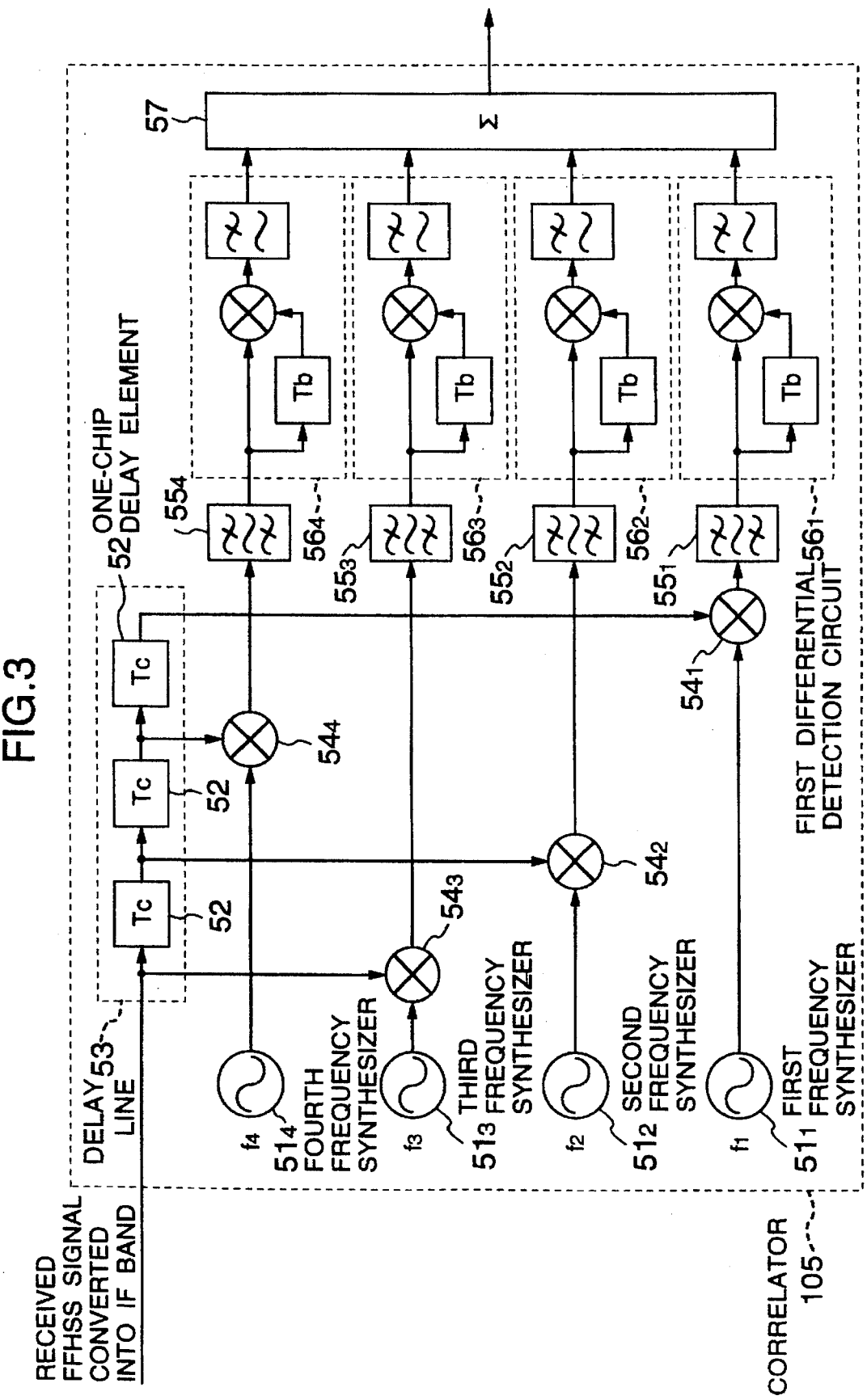
FIG. 3 is a block diagram of a correlator used in an FFHSS receiver according to a first embodiment of the present invention.

The correlator 105 is, as shown in FIG. 3, provided with a delay line 53 in which three pieces of one-chip delay elements 52 having delay time of one chip are arranged, a first to fourth frequency synthesizers $51_1$ to $51_4$ having the output frequencies $f_1$ to $f_M$, respectively, a first to fourth multipliers $54_1$ to $54_4$ for multiplying the output signals of the respective frequency synthesizers $51_1$ to $51_4$ by the respective output signals from the delay line 53, a first to fourth band-pass filters (BPFs) $55_1$ to $55_4$ for limiting the bands of the output signals of the respective multipliers $54_1$ to $54_4$, a first to fourth differential detection circuits $56_1$ to $56_4$ composed of delay elements having delay time Tb (sec), multipliers and low-pass filters, and an adder 57 for adding up the output signals of the respective differential detection circuits $56_1$ to $56_4$.

Figure 5:
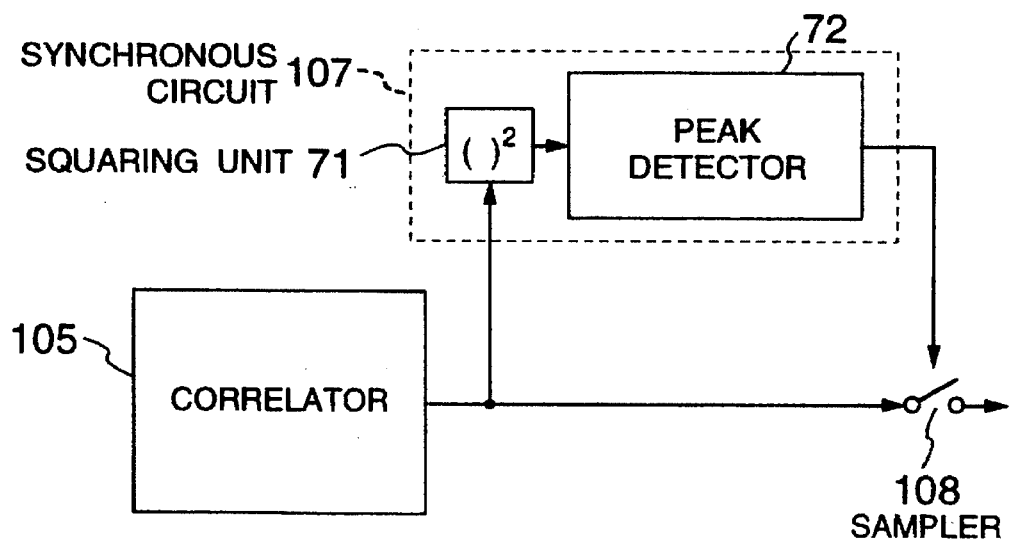
FIG. 5 is a block diagram of a synchronous circuit used in the FFHSS receiver according to the first embodiment.

The synchronous circuit 107 is, as shogun in FIG. 5, provided with a squaring unit 71 for squaring the output signal of the correlator 105, and a peak detector 72 for detecting the peak of the output signal of the squaring unit 71 and operating the sampler 108 at the timing thereof.

In this receiver 100, the multiplier 102 multiplies the signal received by the receiving antenna 101 by a sinusoidal wave signal having a frequency $f_{RF}-f_{IF}$ generated by the local oscillator 103, and the band-pass filter 104 limits the band of the output signal thereof, thus converting the received signal into a signal in an intermediate frequency band having a central frequency of $f_{IF}$.

The FFHSS signal converted into the signal in the intermediate frequency band is inputted to the delay line 53 of the correlator 105 and delayed by one chip period Tc at a time by means of the delay elements 52. The output signal of the third delay element 52 from the input side of the delay line 53 is inputted to the first multiplier $54_1$ and multiplied by the output signal of the first frequency synthesizer $51_1$. The output signal of the second delay element 52 from the input side of the delay line 53 is inputted to the fourth multiplier $54_4$ and multiplied by the output signal of the fourth frequency synthesizer $51_4$. The output signal of the first delay element 52 from the input side of the delay line 53 is inputted to the second multiplier $54_2$ and multiplied by the output signal of the second frequency synthesizer $51_2$. The FFHSS signal converted into the signal in the intermediate frequency band inputted to the delay line 53 of the correlator 105 is inputted to the third multiplier $54_3$ and multiplied by the output signal of the third frequency synthesizer $51_3$.

In this correlator 105, M types of frequencies ($f_1$ to $f_M$) that have been outputted by a conventional hopping synthesizer while changing over them time-wise during 1 Tb in accordance with the allocated hopping sequence at the same time using M pieces of frequency synthesizers 51. Therefore, respective output frequencies of M pieces of frequency synthesizers 51 are set to one of $f_1$ to $f_M$ at a time. Here, M represents a hopping sequence length, and $f_X$ represents a frequency of the Xth frequency slot. The sequence length M in the correlator 105 shown in FIG. 3 is "4", and the adopted hopping sequence is "1, 4, 2, 3". Four chip signals constituting one bit are arranged in frequency bands of $f_1$, $f_4$, $f_2$ and $f_3$, respectively.

The output signals of the first to fourth multipliers $54_1$ to $54_4$ are band-limited by the first to fourth band-pass filters $55_1$ to $55_4$, respectively, and detected thereafter by the first to fourth differential detection circuits $56_1$ to $56_4$, added by the adder 57 and outputted from the correlator 105.

In the correlator 105, since the processing of obtaining correlation between the input signal and the hopping synthesizer output signal is allotted to M pieces of multipliers 54 and frequency synthesizer 51 in the correlator 105, it is possible to obtain a sample that has been obtained spending one bit period Tb by a conventional FFHSS receiver in one chip period Tc. Further, M bit period has been required for obtaining the result of inverse diffusion of a sample in which the timing of the hopping sequence has been changed entirely in a conventional receiver, but it is possible to obtain these samples during one-bit period in this correlator 105.

Figure 4:
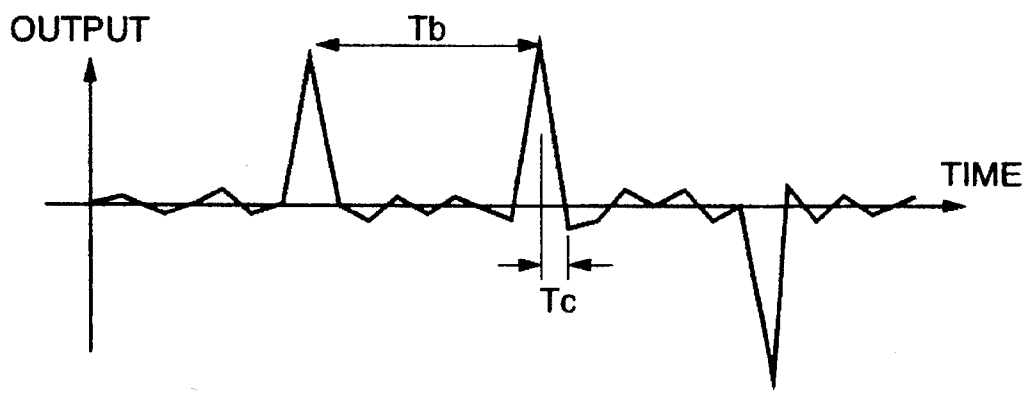
FIG. 4 shows an example of a waveform of an output signal of a correlator used in the FFHSS receiver according to the first embodiment.

Among the samples obtained in one-bit period, a sample in which the frequency hopping sequence of the received signal and the arrangement of output frequencies of respective frequency synthesizers 51 are synchronous with each other always exists. In a sample in which such synchronization is obtained, the output signal of the adder 57 of the correlator 105 shows a large peak as shown in FIG. 4. Then, this peak appears in every bit period Tb.

In the receiver of the first embodiment, a code is decided by sampling peaks that have appeared. In order to do so, the output signal of the correlator 105 is inputted to the sampler 108 and the synchronous circuit 107.

The squaring unit 71 of the synchronous circuit 107 squares the output signal of the correlator 105 that has been inputted, and the peak detector 72 observes the output signal of the squaring unit 71, learns the period and the timing of appearance of the peak and has the sampler 108 operate at the timing that the peak appears. Thus, only the correlator output sample at a peak time is outputted to the code discriminating circuit 109 from the sampler 108, and the code discriminating circuit 109 decides the code of this inputted signal.

As described above, the synchronous circuit 107 secures synchronization of the hopping sequence by such passive and simple processing that, when a peak once in one bit appears in the output signal of the correlator 105, the peak is sampled. The shortest required time for synchronization acquisition of the hopping sequence is the bit period Tb (sec) and can be shortened by a large margin as compared with the conventional device.

(The Second Embodiment)

Figure 9:
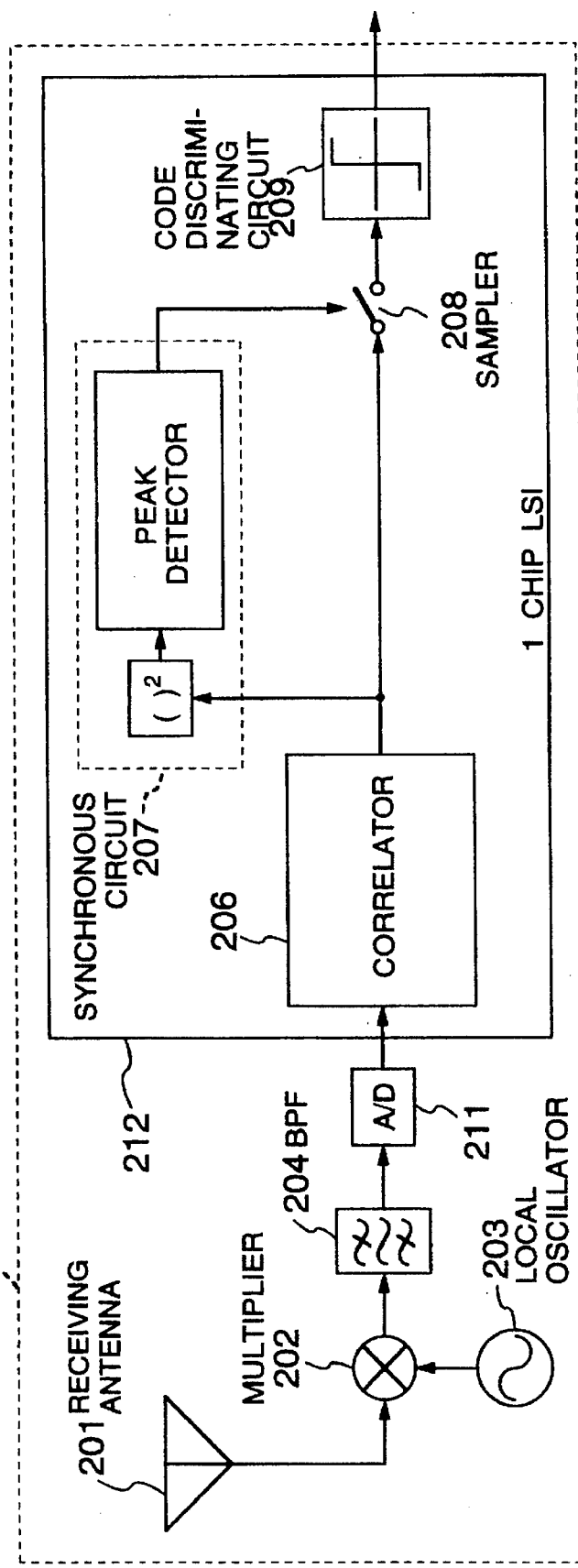
FIG. 9 is a block diagram of the FFHSS receiver according to the second embodiment.

In an FFHSS receiver 210 according to a second embodiment of the present invention, the signal processing is digitized and the hardware is formed in LSI. As shown in FIG. 9, this receiver 210 is provided with an A/D converter 211 for digital conversion of a received FFHSS signal converted into a signal in an intermediate frequency band, a correlator 206, a synchronous circuit 207, a sampler 208 and a code discriminating circuit 209. The correlator 206, the synchronous circuit 207, the sampler 208 and the code discriminating circuit 209 are composed of digital elements and structured of one-chip LSI 212. The other structure is quite the same as that of the receiver 101 (FIG. 6) according to the first embodiment.

Figure 7:
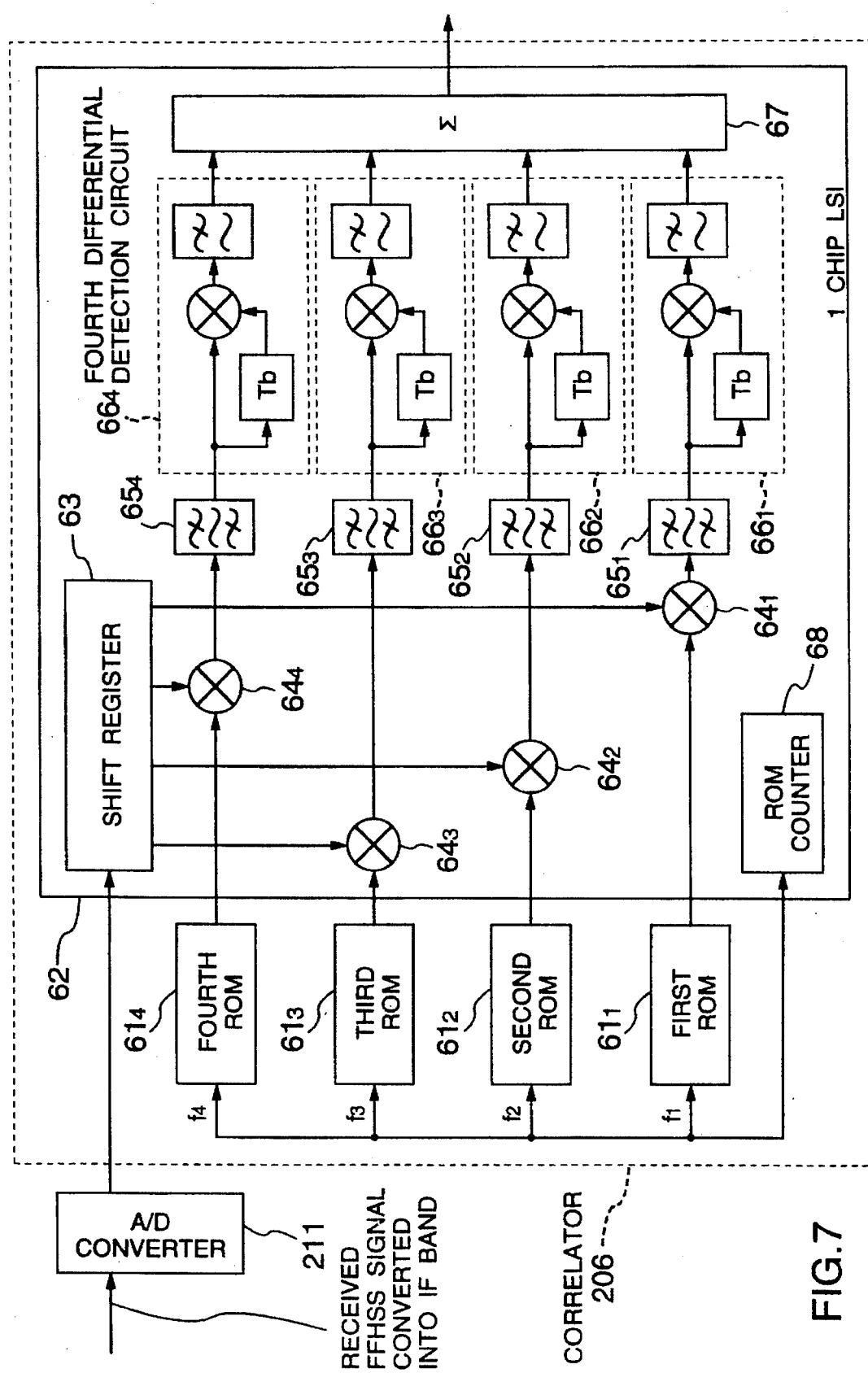
FIG. 7 is a block diagram of a correlator used in an FFHSS receiver according to a second embodiment of the present invention.

In the correlator 206, all the components of the correlator 106 (FIG. 3) of the first embodiment are replaced with digital elements. As shown in FIG. 7, the correlator 206 is provided with a shift register 63 in which the output signal of the A/D converter 211 is inputted, a first to fourth ROMs $61_1$ to $61_4$ where sinusoidal wave signals having frequencies $f_1, f_2, f_3$ and $f_4$ are stored, respectively, a first to fourth digital multipliers $64_1$ to $64_4$, a first to fourth digital filters $65_1$ to $65_4$ in which the output signals of the first to fourth digital multipliers $64_1$ to $64_4$ are inputted, respectively, a first to fourth digital differential detection circuits $66_1$ to $66_4$ in which the output signals of the first to fourth digital filters $65_1$ to $65_4$ are inputted, respectively, a digital adder 67 for adding up the output signals of the first to fourth digital differential detection circuits $66_1$ to $66_4$, and a ROM counter 68 for controlling the read-out timing of the first to fourth ROMs $61_1$ to $61_4$.

Figure 8:
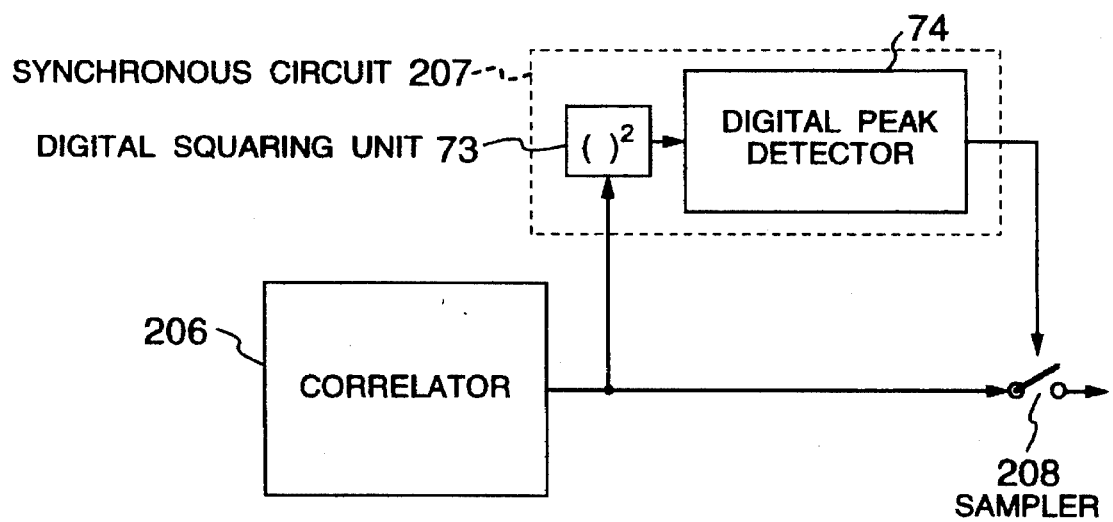
FIG. 8 is a block diagram of a synchronous circuit used in the FFHSS receiver according to the second embodiment.

The synchronous circuit 207 is, as shown in FIG. 8, provided with a digital squaring unit 73 and a digital peak detector 74 in which the output signal of the digital squaring unit 73 is inputted.

In this receiver 210, the FFHSS signal, which is converted into the signal in the intermediate frequency band and outputted from the band-pass filter 204, is converted into a digital signal by means of the A/D converter 211 at the input terminal of the correlator 206. Here, the sampling frequency of the A/D converter 211 is set to W times of the chip rate (i.e., W/Tc).

The FFHSS signal converted into the digital signal is inputted to the shift register 63 of the correlator 206. The shift register 63 has the number of 3W stages, and is driven with a clock having a frequency of W/Tc (Hz). Thus, the time required since data are inputted to the shift register 63 until the data are outputted from the final stage of the shift register 63 becomes 3Tc=Tb−Tc (sec). Besides, the shift register 63 has output terminals also at the Wth stage and the 2Wth stage.

The output signal from the final stage of the shift register 63 is inputted to the first digital multiplier $64_1$ and multiplied by the sinusoidal wave signal having frequency $f_1$ that has been read out of the first ROM $61_1$. The output signal from the 2Wth stage of the shift register 63 is inputted to the fourth digital multiplier $64_4$ and multiplied by the sinusoidal wave signal having frequency $f_4$ that has been read out of the fourth ROM $61_4$. The output signal from the Wth stage of the shift register 63 is inputted to the second digital multiplier $64_2$ and multiplied by the sinusoidal wave signal having frequency $f_2$ that has been read out of the second ROM $61_2$. The FFHSS signal, which is converted into the signal in the intermediate frequency band inputted to the shift register 63 of the correlator 206, is inputted also to the third digital multiplier $54_3$ and multiplied by the sinusoidal wave signal having frequency $f_3$ that has been read out of the third ROM $61_3$. Besides, the sinusoidal wave signals stored in the first to fourth ROMs $61_1$ to $61_4$ are obtained by the digital conversion of the sinusoidal wave signals to be generated by the first to fourth frequency synthesizers $51_1$ to $51_4$ of the first embodiment, respectively.

The output signals of the first to fourth digital multipliers $64_1$ to $64_4$ are band-limited by the first to fourth digital filters $65_1$ to $65_4$, respectively. The output signals of the first to fourth digital filters $65_1$ to $65_4$ are detected by the first to fourth digital differential detection circuits $66_1$ to $66_4$, respectively. The output signals of the first to fourth digital differential detection circuits $66_1$ to $66_4$ are added by the digital adder 67, and the added data are outputted from the correlator 206.

The output data of the correlator 206 are inputted to the sampler 208 and also inputted to the digital squaring unit 73 of the synchronous circuit 207. The digital squaring unit 73 squares the input data and outputs the squared data, and the digital peak detector 74 observes the output signal of the digital squaring unit 73, learns the period and the timing of the peak appearance and has the sampler 208 operate in that timing. As a result, the sampler 208 has only the peak of the data sample outputted from the correlator 206 pass through.

The output signal of the sampler 208 is inputted to the code discriminating circuit 209, and the code discriminating circuit 209 determines the code.

In this receiver 210, the correlator 206, the synchronous circuit 207, the sampler 208 and the code discriminating circuit 209 can be realized with one LSI 212 collectively. Therefore, a small quantity of analog devices to be required are sufficient, and the scale of the hardware can be made smaller and characteristics are stabilized.

Besides, the correlators 105 and 206 that have been used in the receivers of the first and second embodiments can also be used as measuring equipments only for detecting the correlation between the input signal and the output signal of the hopping synthesizer in a similar manner as the power measuring equipment 24 of the conventional receiver. Even when the correlator is used in such a manner, it is possible to detect a synchronized state of the hopping sequence during an interval of bit period Tb (sec) and to offer the information thereof.

Further, when the correlator 206 is used as an independent element, it is possible to realize all the components except the ROMs $61_1$ to $61_4$ of the correlator 206 with one-chip LSI 262 as shown in FIG. 7. When this is done, analog devices are reduced in quantity, the scale of the hardware can be made smaller, and characteristics are stabilized.

Further, these correlators 105 and 206 and the synchronous circuits 107 and 207 can be used as the synchronizer for detecting the synchronization of the hopping sequence. For example, it is possible to assemble them into a receiver as a device for transmitting the synchronizing time to the hopping synthesizer 22 of the conventional receiver.

As it is apparent from the description of the above-mentioned embodiments, the correlator of the present invention can reduce the shortest time required for synchronization acquisition of the hopping sequence to the bit period Tb.

Further, the synchronous circuit of the present invention has a peak of the output of the correlator thereof, and can obtain synchronization of the hopping sequence by such passive and simple processing that the peak is sampled when it appears.

Further, since the receiver of the present invention can secure the synchronization of the hopping sequence in a short period of time, it becomes unnecessary to send training data for synchronization acquisition that are transmitted prior to commencement of communication for a long time, thus making it possible to increase utilization efficiency of a communication line.

What is claimed is:

1. A correlator for a fast frequency hopping spread spectrum receiver used in a fast frequency hopping spread spectrum communication system in which a narrow-band modulated signal to be transmitted is cut and divided into M pieces per one bit (M is an integer) of chip signals at equal intervals time-wise and the respective chip signals are transmitted on M pieces of carriers having different frequencies, respectively, and in which an interval between said chip signals is defined as a chip period, comprising:

M pieces of frequency synthesizers for outputting M pieces of sinusoidal wave signals having the same frequencies as the frequencies of said M pieces of carriers;

delay means including a plurality of delay elements connected with one another in a cascade for delaying input signals of said correlator by each of said delay elements so as to convert the signals into M pieces of parallel input signals having different delay time, respectively, said respective delay elements having said chip period as the delay time;

M pieces of multiplying means, said respective multiplying means multiplying one of said M pieces of parallel signals by one of said M pieces of sinusoidal wave signals which has been made in advance to correspond to said one parallel signal;

M pieces of detection means for detecting output signals of said M pieces of multiplying means, respectively; and adding means for adding up output signals of said M pieces of detection means.

2. A correlator according to claim 1, wherein:

said M pieces of frequency synthesizers and said M pieces of multiplying means are composed of digital elements; and said delay means is composed of a shift register.

3. A synchronizer for a fast frequency hopping spread spectrum receiver used in a fast frequency hopping spread spectrum communication system in which a narrow-band modulated signal to be transmitted is cut and divided into M pieces per one bit (M is an integer) of chip signals at equal intervals time-wise and respective chip signals are transmitted on M pieces of carriers having different frequencies, respectively, and in which an interval between said chip signals is defined as a chip period, comprising:

a correlator; and a peak detection means for detecting a peak of an output signal of said correlator; wherein said correlator includes:

M pieces of frequency synthesizers for outputting M pieces of sinusoidal wave signals having the same frequencies as the frequencies of said M pieces of carriers;

delay means including a plurality of delay elements connected with one another in a cascade for delaying input signals of said correlator by each of said delay elements so as to convert the input signals into M pieces of parallel input signals having different delay time, respectively, said respective delay elements having said chip period as the delay time;

M pieces of multiplying means, said respective multiplying means multiplying one of said M pieces of parallel signals by one of said M pieces of sinusoidal wave signals which has been made in advance to correspond to said one parallel signal;

M pieces of detection means for detecting output signals of said M pieces of multiplying means, respectively; and adding means for adding up output signals of said M pieces of detection means.

4. A synchronizer according to claim 3, wherein:

said M pieces of frequency synthesizers and said M pieces of multiplying means are composed of digital elements; and said delay means is composed of a shift register.

5. A fast frequency hopping spread spectrum receiver used in a fast frequency hopping spread spectrum communication system in which a narrow-band modulated signal to be transmitted is cut and divided into M pieces per one bit (M is an integer) of chip signals at equal intervals time-wise and the respective chip signals are transmitted on M pieces of carriers having different frequencies, respectively, and in which an interval between said chip signals is defined as a chip period, comprising:

a synchronizer provided with a correlator and a peak detection means for detecting a peak of an output signal of said correlator and outputting a detection signal;

a sampler for having an output signal of said correlator pass therethrough when said detection signal is outputted from said synchronizer; and a code discriminating means for discriminating a code of an output signal of said sampler; wherein said correlator includes:

M pieces of frequency synthesizers for outputting M pieces of sinusoidal wave signals having the same frequencies as the frequencies of said M pieces of carriers;

delay means including a plurality of delay elements connected with one another in a cascade for delaying input signals of said correlator by each of said delay elements so as to convert the input signals into M pieces of parallel input signals having different delay time, respectively, said respective delay elements having said chip period as the delay time;

M pieces of multiplying means, said respective multiplying means multiplying one of said M pieces of parallel signals by one of said M pieces of sinusoidal wave signals which has been made in advance to correspond to said one parallel signal;

M pieces of detection means for detecting output signals of said M pieces of multiplying means, respectively; and adding means for adding up output signals of said M pieces of detection means.

6. A fast frequency hopping spread spectrum receiver according to claim 5, wherein:

said M pieces of frequency synthesizers and said M pieces of multiplying means are composed of digital elements; and said delay means is composed of a shift register.

* * * * *